US010107515B2

(12) United States Patent
Ableitner et al.

(10) Patent No.: US 10,107,515 B2
(45) Date of Patent: Oct. 23, 2018

(54) HVAC CONTROLLER WITH PROXIMITY SENSOR

(71) Applicant: Honeywell International Inc., Morristown, NJ (US)

(72) Inventors: Jason Ableitner, Edina, MN (US); Robert D. Juntunen, Minnetonka, MN (US); Robert Lee, Garden City, NY (US); Brad Terlson, Maple Grove, MN (US); Eric Barton, Eden Prairie, MN (US); Matthew E. L. Jungwirth, St. Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 452 days.

(21) Appl. No.: 14/297,313

(22) Filed: Jun. 5, 2014

(65) Prior Publication Data

US 2015/0355371 A1    Dec. 10, 2015

(51) Int. Cl.
*F24F 11/00*    (2018.01)
*G05D 23/19*    (2006.01)
(Continued)

(52) U.S. Cl.
CPC .......... *F24F 11/0086* (2013.01); *F24F 11/30* (2018.01); *G05D 23/1902* (2013.01);
(Continued)

(58) Field of Classification Search
CPC ................ F24F 11/001; F24F 11/0034; F24F 2011/0035; F24F 2011/0036; G05D 23/27
See application file for complete search history.

(56) References Cited

U.S. PATENT DOCUMENTS 4,978,843 A * 12/1990 Yamakawa .............. G01V 8/14
250/216
8,629,930 B2 * 1/2014 Brueckner ........... H04N 5/3572
348/335
(Continued)

FOREIGN PATENT DOCUMENTS

CN          103618849 A      3/2014
JP    WO 2010125615 A1 *  11/2010 ............ F24F 1/0007

OTHER PUBLICATIONS

Murata Manufacturing Co., Ltd., "Pyroelectric Infrared Sensors," muRata Innovator in Electronics, 25 pages, Oct. 1, 2012. S21J.pdf, http://www.murata.com/.

*Primary Examiner* — Frantz Jules
*Assistant Examiner* — Nelson Nieves
(74) *Attorney, Agent, or Firm* — Seager Tufte & Wickhem LLP

(57) ABSTRACT

An HVAC controller such as a thermostat may include a housing having an aperture formed within the housing and a proximity sensor that is disposed within the housing proximate the aperture. The proximity sensor may include a sense die that has a first IR detector and a second IR detector, and a lens element disposed in front of the sense die. The lens element may be shifted to one side to preferentially direct incident IR energy to the first IR detector at the expense of the second IR detector. An IR energy transparent element may be disposed in front of the lens element, and may include a portion that fits into and seals the aperture formed within the housing. A controller may be configured to receive an electrical signal from the proximity sensor indicating an approach of an individual towards the thermostat, and in response, wake-up a user interface.

14 Claims, 8 Drawing Sheets

(51) Int. Cl.
*F24F 11/30* (2018.01)
*F24F 110/00* (2018.01)
*F24F 120/10* (2018.01)
*F24F 11/52* (2018.01)

(52) U.S. Cl.
CPC ........... *F24F 11/52* (2018.01); *F24F 2110/00* (2018.01); *F24F 2120/10* (2018.01)

(56) References Cited

U.S. PATENT DOCUMENTS

| | | | | |
|---|---|---|---|---|
| 2012/0274811 | A1* | 11/2012 | Bakin | H04N 3/1593 348/239 |
| 2014/0346362 | A1* | 11/2014 | Filson | G05D 23/27 250/349 |
| 2015/0233595 | A1* | 8/2015 | Fadell | F24F 11/0034 700/278 |
| 2015/0248796 | A1* | 9/2015 | Iyer | G07C 9/00007 340/5.61 |

* cited by examiner

HVAC CONTROLLER WITH PROXIMITY SENSOR

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Improvements in the hardware, the user experience, and the functionality of such systems are desirable.

SUMMARY

This disclosure relates to methods and apparatus for controlling an HVAC system. The disclosure also relates to improvements in hardware, user experience, and functionality of an HVAC controller such as a thermostat.

In an illustrative but non-limiting example, the disclosure describes a thermostat that includes a housing having an aperture formed within the housing, and a proximity sensor that is disposed within the housing proximate the aperture. The proximity sensor may include a sense die having a first IR detector on the sense die and a second IR detector on the sense die. A lens element may be disposed in front of the sense die. The lens element may be shifted to one side to preferentially direct incident IR energy to the first IR detector at the expense of the second IR detector. An IR energy transparent element may be disposed in front of the lens element and, in some cases, may include a portion that fits into and seals the aperture in the housing. A controller may be configured to receive an electrical signal from the proximity sensor that is indicative of an approach of an individual towards the thermostat.

In another illustrative but non-limiting example, the disclosure describes an HVAC controller that includes a housing and a proximity sensor that is secured relative to the housing. The proximity sensor may have a field of view that is suitable for viewing an individual that is moving towards the HVAC controller. The proximity sensor may include a first IR detector secured relative to the housing and a second IR detector secured relative to the housing. The second IR detector may be laterally spaced from the first IR detector. The proximity sensor may also include a lens element that is disposed in front of the first IR detector and the second IR detector, the lens element may be configured to preferentially directing incident IR energy to the first IR detector at the expense of the second IR detector. A controller may be operatively coupled to the proximity sensor, and may be configured to wake up the HVAC controller in response to the proximity sensor sensing an individual moving towards the HVAC controller.

In another illustrative but non-limiting example, a proximity detector may include a first detector for detecting an energy band and a second detector for detecting the energy band, wherein the second detector laterally spaced from the first detector. A lens element may be disposed in front of the first detector and the second detector, and may preferentially directing incident energy from the energy band to the first detector at the expense of the second detector.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF DRAWINGS

The disclosure may be more completely understood in consideration of the following detailed description in connection with the accompanying drawings, in which.

Figure 1:
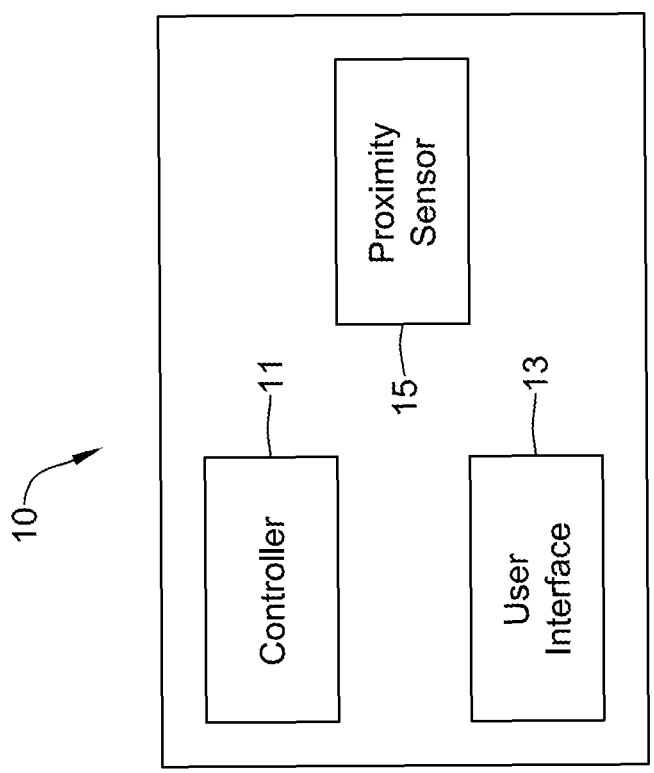
FIG. 1 is a schematic block diagram of an illustrative HVAC controller.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements within a group of figures having the same figure number. Like reference numeral will not necessarily indicate like elements across different figure numbers. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about." The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", "an illustrative embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Within this disclosure, the terms "thermostat", "programmable thermostat", "WiFi enabled thermostat", "HVAC controller", and "device" may refer to an HVAC controller when the context makes clear that reference to the thermostat as a whole is intended. Although reference is made to a programmable thermostat in portions of the description that follows, it should be appreciated that each of those descriptions may apply to a programmable thermostat which may be expressly WiFi enabled even when the feature or features described do not expressly mention or require a communication link such as a WiFi connection.

FIG. 1 is a schematic illustration of an HVAC controller 10 suitable for use in controlling a variety of different HVAC equipment such as, but not limited to, furnaces, air conditioners, humidifiers, air exchangers and the like. In some embodiments, the HVAC controller 10 includes a controller 11 that is configured to operate in accordance with an algorithm that controls or at least partially controls one or more HVAC components of an HVAC system. The HVAC controller 10 may include a user interface 13 that is configured to display information for the user as well as to solicit and obtain information from the user. In some embodiments, the HVAC controller 10 may include a proximity sensor 15 that is configured to determine, for example, when a user is approaching the HVAC controller 10, and to wake up the HVAC controller 10 and/or the user interface 13 of the HVAC controller 10 before the individual reaches the HVAC controller 10. As a result, when the user reaches the HVAC controller 10, the HVAC controller 10 is already awake and ready to display and/or solicit information from the user.

The HVAC controller 10 may, for example, operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory of the HVAC controller 10 and, in some cases, may be received from an external web service. The control algorithm (or portion thereof) stored locally in the memory of the HVAC controller 10 may in some cases be periodically updated in accordance with a predetermined schedule (e.g. once every 24 hours, 48 hours, 72 hours, weekly, monthly, etc.), updated in response to any changes to the control algorithm (e.g. set point change) made by a user, and/or updated in response to a user's request. The updates to the control algorithm or portion of the control algorithm (e.g. set points, schedules, etc.) stored in the memory may be received from an external web service. In some cases, the control algorithm may include settings such as set points.

In some cases, the HVAC controller 10 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system is located is expected to be unoccupied for an extended period of time. In other cases, the third operating mode may correspond to a sleep mode wherein the building occupants are either asleep or inactive for a period of time. These are just some examples. It will be understood that the HVAC controller 10 may be capable of operating in additional modes as necessary or desired. The number of operating modes and the operating parameter settings associated with each of the operating modes may be established locally through a local user interface 13, through a remote user device (e.g. user's cell phone) and/or through an external web service and delivered to the HVAC controller 10 where they may be stored in memory.

In some cases, the HVAC controller 10 may operate according to one or more predetermined operating parameter settings associated with a user profile for an individual user. The user profile may be stored in the memory of the HVAC controller 10 and/or may be hosted by an external web service and stored on an external web server. The user profile may include one or more user-selected settings for one or more operating modes that may be designated by the user. For example, the HVAC controller 10 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system is located may be unoccupied for an extended period of time. In some cases, multiple user profiles may be associated with the HVAC controller 10.

In some cases, the HVAC controller 10 may be programmed to execute a guided set-up routine that may guide a user through configuring the HVAC controller 10 to control one or more HVAC components of their particular HVAC system. In some cases, the user may have limited knowledge about the particular HVAC system configuration. The guided set-up routine may be configured to guide a user through set-up of the HVAC controller 10 without requiring detailed knowledge of the particular HVAC system and/or without requiring the user to consult a technical manual or guide. Further details pertaining to the programming and use of the illustrative HVAC controller 10 may be found in U.S. Provisional Application Ser. No. 61/914,877, filed Dec. 11, 2013, which is incorporated herein by reference in its entirety.

While the HVAC controller 10 is described with respect to a particular embodiment of HVAC controller 10, it will be appreciated that this description is illustrative only, as an HVAC controller 10 may take a variety of different physical shapes and configurations, and can include or exclude any variety of programming features.

With reference to FIG. 1, the user interface 13 may provide a user of the HVAC controller 10 with information pertaining to the status and operation of the HVAC system. The user interface 13 may include one or more displays that are configured to provide information to the user. The user interface 13 may also include, for example, one or more touch screens, buttons, switches or knobs that enable a user to provide information to the HVAC controller 10. This sometimes includes HVAC programming information as described above. The user interface 13 can include any particular hardware or software that enables information to be displayed to the user and/or solicited or received from the user.

The proximity sensor 15 can be configured to detect the presence of a person near the HVAC controller 10. The proximity sensor 15 may operate by detecting any desired or useful energy band within the electromagnetic spectrum. An energy band may be considered as referring to energy within a particular frequency or wavelength range. In some embodiments, the proximity sensor 15 may be sensitive to the infrared (IR) portion of the electromagnetic spectrum.

In some embodiments, this detection may be provided by a passive infrared sensor (PIR). In some cases, the sensor may detect thermal radiation of human body (e.g. wavelength of 5-15 micrometers—infrared area [IR]), and convert it to a change of crystal capacitance, a pulse, and/or some other electrical signal that is indicative of the magnitude of detected IR radiation. In some cases, the proximity sensor 15 may include two separate detectors on a sensor die, each laterally spaced from the other. Having two spaced sensor may help detect lateral motion across the field of view of the proximity sensor 15. While IR sensors are disclosed here as one example, it is contemplated that any suitable sensor may be used, as desired.

In some instances, the controller 11 may be configured to wake up the HVAC controller 10 in response to detecting an individual moving towards the HVAC controller 10, and in some cases may be configured to not wake up the HVAC controller 10 in response to detecting an individual moving laterally with respect to the HVAC controller 10. In some cases, when the HAC controller 10 includes a display screen, waking up the HVAC controller 10 includes energizing the display screen so that the approaching individual can read information displayed on the display screen without having to first interact with the HVAC controller 10. In some instances, the controller 11 may be configured to detect the approach of the individual and wake up the HVAC controller 10 when the individual is within a threshold distance of 4 feet (or less) from the HVAC controller 10. In some cases, the threshold distance may be a programmable parameter that is referenced by the controller 11.

Figure 2:
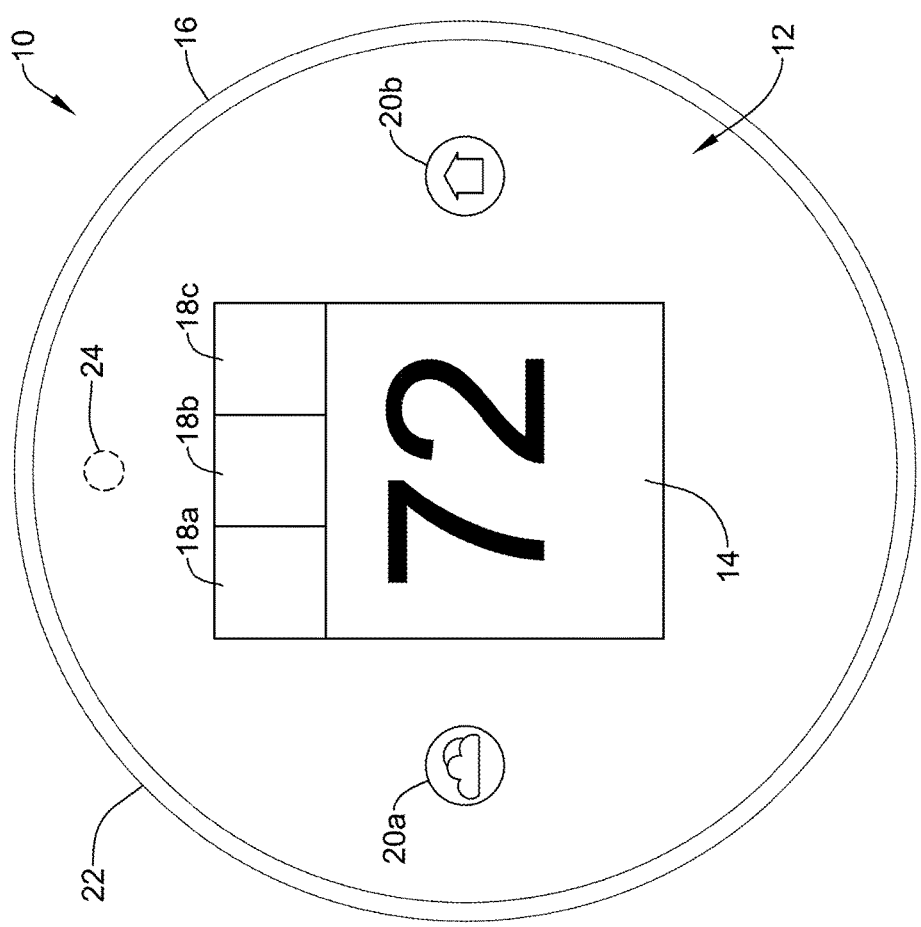
FIG. 2 is a front view of an illustrative HVAC controller.

FIG. 2 is a front view of an illustrative embodiment of the HVAC controller 10. It will be appreciated that the HVAC controller 10 of FIG. 1 may take any of a variety of different configurations, and is not limited to that shown in FIG. 2. The illustrative HVAC controller 10 of FIG. 2 includes a user interface 12. In some embodiments, the HVAC controller 10 may be considered to be a programmable thermostat, although this is not required. As shown in FIG. 2, the user interface 12 may include a display 14 disposed within or supported by a housing 16. In some cases, the display 14 may be a touch screen display, but this is not required. The user interface 12 may include one or more touch sensitive regions 18a, 18b, 18c provided on the display 14, each touch sensitive region may define a button through which the user may interact with the HVAC controller 10.

Additionally or in alternative to, the user interface 12 may also include one or more buttons 20a and 20b that may be provided separate from the display 14 through which the user may interact with the HVAC controller 10. In some cases, the buttons 20a, 20b may be touch sensitive capacitive buttons. In other cases, the buttons 20a, 20b may be hard, physical buttons or soft keys. It will be generally understood that the size and shape of the display as well as the number and location of the various buttons (if any) can vary.

The housing 16 may be fabricated from any suitable material. As shown in FIG. 2, the housing 16 may have a generally circular foot print, but this is not required. In some cases, the housing 16 may support a rotating ring 22 which may form part of the user interface 12, and which may provide another mechanism for accepting an input from a user. For example, the user may rotate the ring 22 to increase or decrease an operating parameter (e.g. set point) or to change information viewed on the display 14 by advancing from a first screen to a second screen displayed on the display 14. While the user interface 12 that is provided at the HVAC controller 10 may be capable of receiving user interactions, in some cases a more advanced or detailed user interface 12 for more fully interacting with the HVAC controller 10 may be provided by an application program executed at a user's remote device (e.g. user's cell phone) and/or by one or more web pages served up by a web server.

As seen in FIG. 2, the HVAC controller 10 may also include an aperture 24 that is formed in the front of the HVAC controller 10. As will be described with respect to subsequent Figures, the aperture 24 may be configured to accommodate a proximity sensor 15 (FIG. 1).

Figure 3:
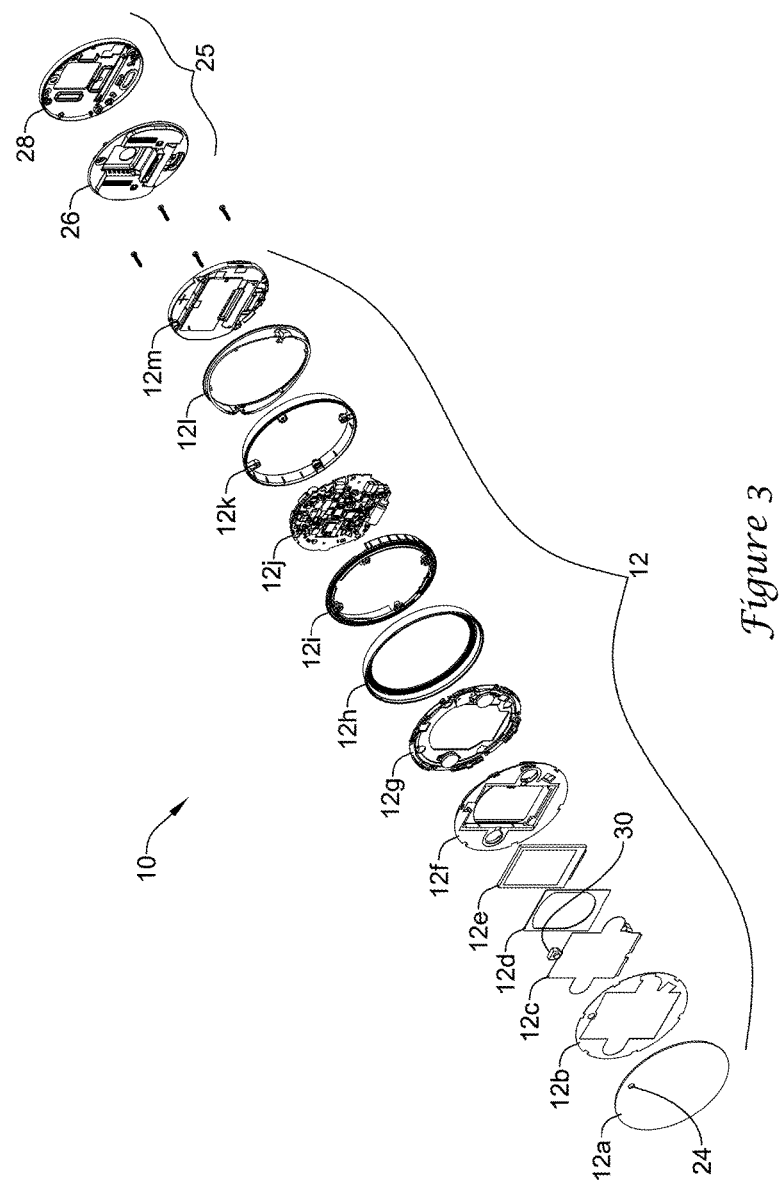
FIG. 3 is an exploded perspective view of the illustrative HVAC controller of FIG. 2.

FIG. 3 provides an exploded perspective view of a number of components that, in combination, may form an illustrative HVAC controller 10. It will be appreciated that this is just an illustrative example, as the HVAC controller 10 may include some of these components while excluding others. Embodiments of the HVAC controller 10 may also include additional components not expressly illustrated here. These elements, in combination, may be considered as providing the user interface 12 as well as other components.

In some embodiments, the user interface 12 may include one or more of a display window/mask 12a (bearing the aperture 24), an adhesive layer 12b, a capacitive touch element 12c (forming a touch screen), a display gasket 12d, a display 12e, a window support and IR sensor 12f, a button light guide assembly 12g, a turning ring and code wheel 12h, a sliding ring 12i, a printed wiring board 12j (which will be referenced in subsequent drawings), a back ring 12k, a light ring 12l and a case back 12m. In some embodiments, these components in combination may be secured to a wall plate assembly 25 that includes a front plate 26 and a rear plate 28.

Figure 4:
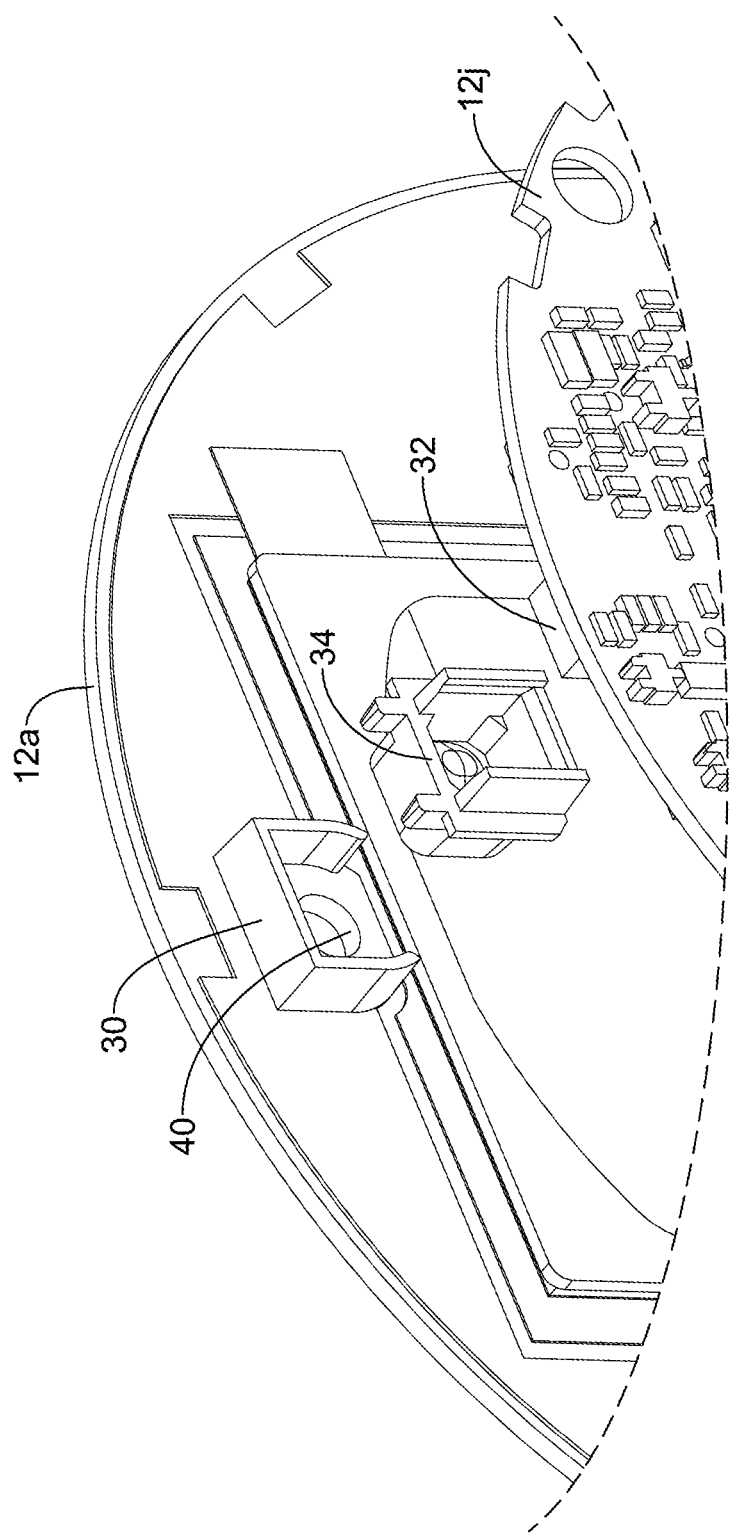
FIG. 4 is a close up exploded perspective view of a portion of the illustrative HVAC controller of FIG. 2.

As noted, and in some instances, an IR energy transparent element 30 may be positioned such that it fits into and seals the aperture 24 that is formed in the display window/mask 12a, but this is not required. The IR energy transparent element 30 may form, as will be discussed, part of the proximity sensor 15 (FIG. 1). FIG. 4 is an exploded perspective view of a portion of the HVAC controller 10, illustrating the relative position of the IR energy transparent element 30 and the printed wiring board 12j. In the illustrative embodiment, the IR energy transparent element 30 includes a protruding central portion 40 that is sized and configured to fit into and seal the aperture 24 in the front of the HVAC controller 10 (in the display window/mask 12a).

Figure 5:
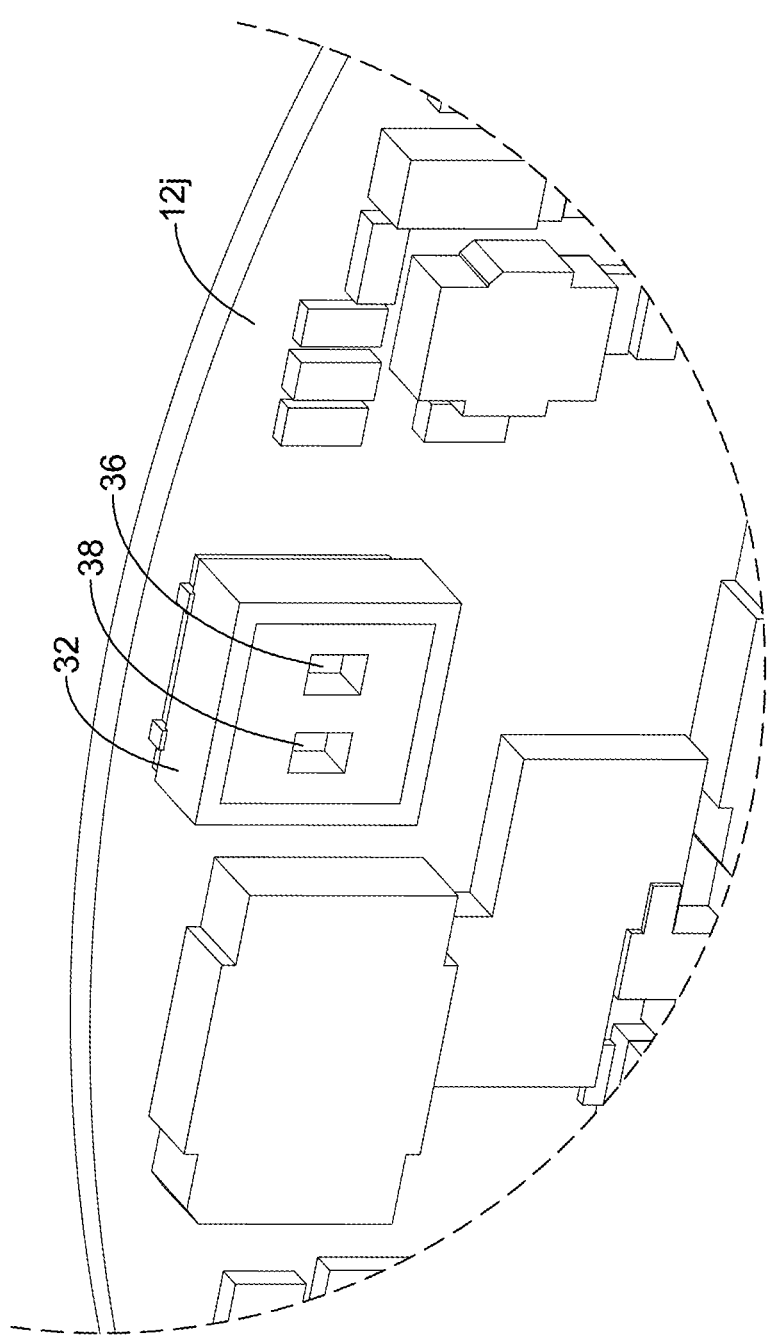
FIG. 5 is a close up view of a portion of the illustrative HVAC controller of FIG. 2.

A sense die 32 is shown disposed on the printed wiring board 12j, and a lens 34 is shown disposed between the IR energy transparent element 30 and the sense die 32 on the printed wiring board 12j. In some embodiments, other electrical components including the controller 11 (FIG. 1) may be disposed, at least in part, on the printed wiring board 12j. As illustrated in FIG. 5, the sense die 32 may be seen as including a first detector 36 and a second detector 38, wherein the second detector 38 is laterally spaced from the first detector 36. In some embodiments, the first detector 36 is a first IR detector and the second detector 38 is a second IR detector, but this is not required. In some embodiments, one or more filter elements (not illustrated) may be integrally formed as part of the first detector 36 and/or the second detector 38. In some embodiments, one or more filter elements (not illustrated) may be separately formed and positioned relative to the first detector 36 and/or the second detector 38. In some embodiments, the sense 32 or a portion thereof may include a glass seal over the first detector 36 and/or the second detector 38.

In some instances and in order to improve sensitivity to detecting an individual directly approaching the HVAC controller 10 while decreasing sensitivity to an individual moving laterally with respect to the HVAC controller 10, the lens 34 may be configured to preferentially direct incident energy from an energy band to the first detector 36 at the expense of the second detector 38. It will be appreciated that in some embodiments, the lens 34 may instead be configured to preferentially direct incident energy to the second detector 38 at the expense of the first detector 36. In some cases, the lens 34 may be configured to direct substantially all of the incident energy (such as incident IR energy) to the first detector 36 while directly virtually none of the incident energy (such as incident IR energy) to the second detector 38.

In some cases, the lens 34 may be configured to direct greater than 70% of the incident energy (such as incident IR energy) to the first detector 36, and/or direct less than 30% of the incident energy (such as incident IR energy) to the second detector 38. In some cases, the lens 34 may be configured to direct greater than 80% of the incident energy (such as incident IR energy) to the first detector 36, and/or direct less than 20% of the incident energy (such as incident IR energy) to the second detector 38. In some cases, the lens 34 may be configured to direct greater than 90% of the incident energy (such as incident IR energy) to the first detector 36, and/or direct less than 10% of the incident energy (such as incident IR energy) to the second detector 38. In some cases, the lens 34 may be configured to direct greater than 95% of the incident energy (such as incident IR energy) to the first detector 36, and/or direct less than 5% of the incident energy (such as incident IR energy) to the second detector 38.

In some embodiments, while the sense die 32 is illustrated as including a pair of detectors (the first detector 36 and the second detector 38), it will be appreciated that the sense die 32 can instead include any particular number of distinct detectors. For example, in some embodiments, the sense die 32 could include a total of four detectors. In an example in which the sense die 32 includes four distinct detectors, the lens 34 may be configured to preferentially direct incident energy (such as incident IR energy) to one or two of the four detectors at the expense of the remaining detectors.

Figure 6:
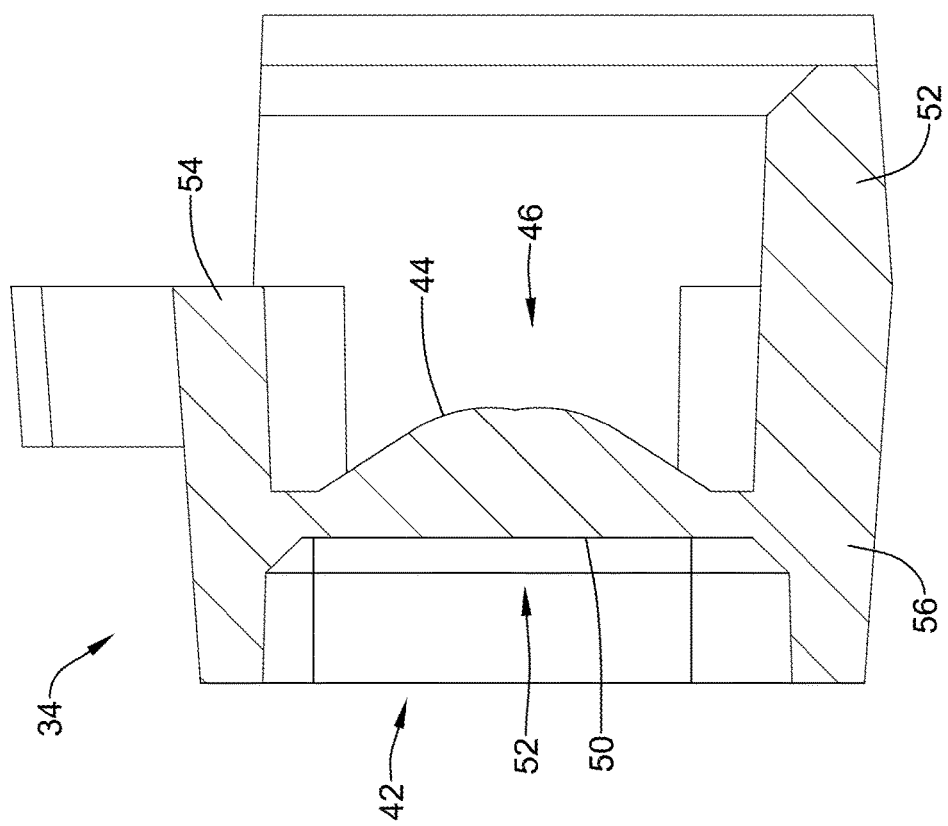
FIG. 6 is a first cross-sectional view of a portion of the illustrative HVAC controller of FIG. 2.
Figure 7:
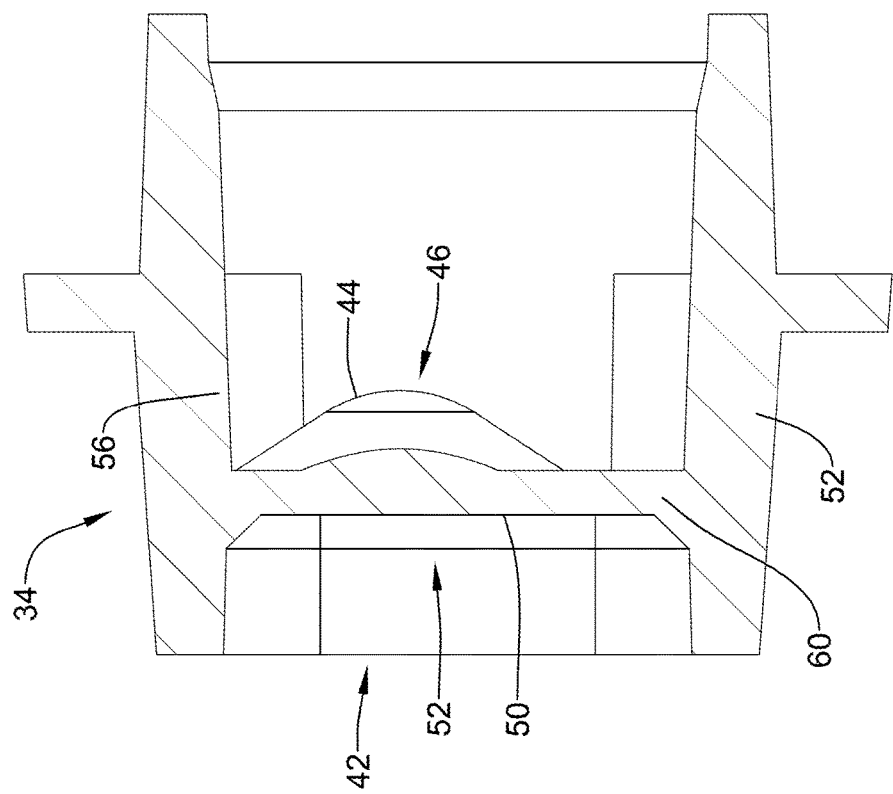
FIG. 7 is a second cross-sectional view of a portion of the illustrative HVAC controller of FIG. 2.

FIGS. 6 and 7 provide several cross-sectional views of the lens 34, illustrating an embodiment in which the lens element is shifted or offset relative to first and second detectors 36, 38 of the proximity sensor 15. FIG. 6 may be considered as showing the lens element as being centered in a vertical plane passing through the lens 34, viewed from a side, while FIG. 7 may be considered as showing the lens element as being shifted in a horizontal plane passing through the lens 34, viewed from above. It will be appreciated that references to vertical and horizontal refer to the illustrated orientation as the proximity sensor 15 (FIG. 1) may function in any orientation.

In the example shown, the lens 34 may include a lens element 42 having a curved surface 44 forming a convex shape on a first side 46 of the lens 34 closest to the sense die 32, and may have a planar or substantially planar surface 48 on a second side 50 of the lens 34 closest to the IR energy transparent element 30 (when provided). In some embodiments, the curved surface 44 may have a radius of curvature that is in the range of about 1 millimeter to about 2 millimeters, 0.5 millimeter to about 4 millimeters, 0.25 millimeter to about 8 millimeters, or any other suitable dimension. In some cases, the curved surface 44 may not have a uniform radius of curvature, but rather may have a first radius of curvature over a first part of the curved surface 44 and a second radius of curvature over a second part of the curved surface 44. In some instances, at least part of the curved surface 44 may have a shape that is, for example, parabolic and/or any other suitable shape, as desired. In some cases, the lens 34 may include a leg structure 52 that helps defines a spacing between the curved surface 44 and the sense die 32.

It can be seen that in FIG. 6, the curved surface 44 is centered or substantially centered between an upper side 54 of the lens 34 and a lower side 56 of the lens 34. Again, references to relative position are illustrative only and refer to the illustrated orientation. In FIG. 7, the curved surface 44 can be seen as being shifted towards what would be a right hand side 58 of the lens 34 (with respect to the orientation of the lens 34 shown in FIG. 4) and away from what would be a left hand side 60 of the lens 34. In some embodiments, this shift is in the range of about 0.1 to about 5 millimeters, or about 0.2 to about 3 millimeters, or about 0.3 to about 2 millimeters, or about 0.4 to about 1.25 millimeters. In some embodiments, this shift is about 0.75 millimeters.

Figure 8:
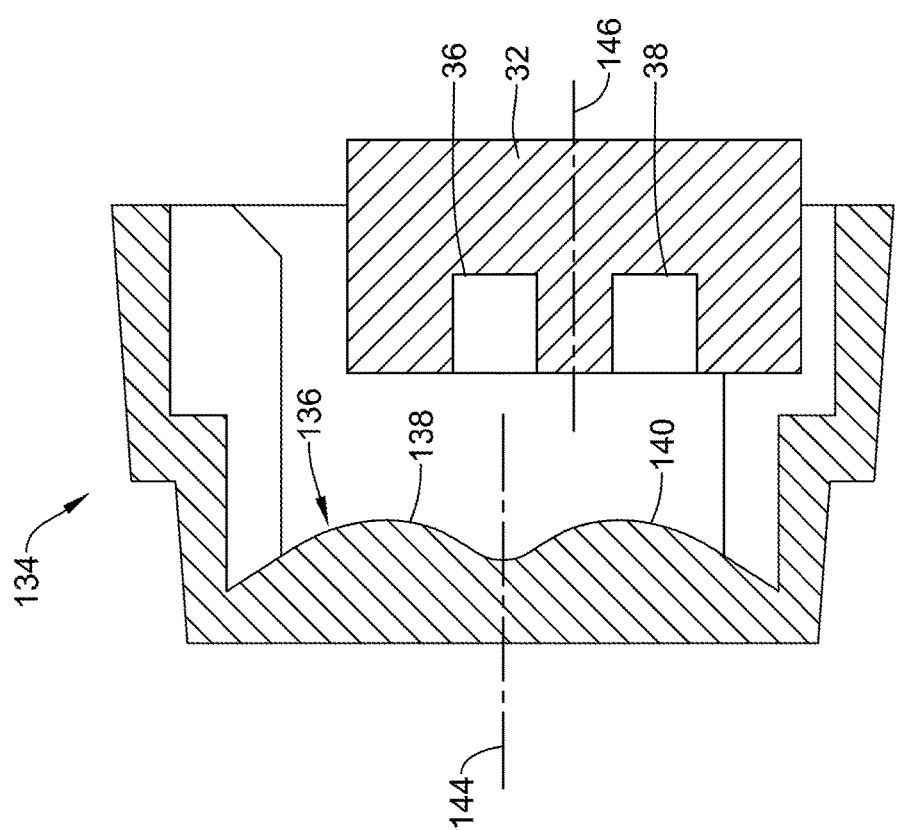
FIG. 8 is a cross-sectional view of a lens and proximity sense die combination in accordance with another example of the present disclosure.

FIGS. 6 and 7 illustrate a lens 34 having a curved surface 44 that may define a single convex lens portion. In some embodiments, a lens may be used that has more than one convex lens portion. For example, FIG. 8 illustrates a lens 134 disposed in front of the sense die 32. The lens 134 may be considered as having a curved surface 136 defining a first convex lens portion 138 and a second convex lens portion 140. The lens 134 may have a planar or substantially planar surface 142 on the side of the lens 134 that is opposite that of the curved surface 136, but this is not required. In some cases, both sides of the lens may be curved. By comparing a center line 144 of the lens 134 with a center line 146 of the sense die 32, it can be seen that the lens 134 has been shifted relative to the sense die 32. In some embodiments, the lens 34 may instead be a Fresnel type lens. A Fresnel type lens can be made thinner than the lens 34 as illustrated by including a series of sawtooth shapes that help to direct and focus incident energy such as IR energy.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment in other example embodiments. The scope is, of course, defined in the language in which the appended claims are expressed.

What is claimed is:
1. A thermostat comprising:
   a housing including an aperture formed within the housing;
   a proximity sensor disposed within the housing proximate the aperture, the proximity sensor comprising:
      a sense die including a first IR detector on the sense die and a second IR detector on the sense die, wherein the second IR detector is offset relative to the first IR detector, and wherein a surface of the first IR detector and a surface of the second IR detector are parallel to each other;
      a lens element disposed in front of the sense die, the lens element configured to preferentially direct substantially all incident IR energy passing through the aperture in the housing to the first IR detector by refracting incident IR energy initially directed to the second IR detector toward the first IR detector in order to increase sensitivity of the proximity sensor; and an IR energy transparent element disposed in front of the lens element and including a portion that fits into and seals the aperture formed within the housing; and a controller that is configured to receive an electrical signal from the proximity sensor indicating an approach of an individual towards the thermostat.

2. The thermostat of claim 1, wherein the controller is configured to wake up the thermostat in response to the approach of an individual towards the thermostat.

3. The thermostat of claim 2, wherein the thermostat further comprises a user interface that includes a display screen, and waking up the thermostat comprises energizing the display screen so that the approaching individual can read information displayed on the display screen without having to first interact with the user interface of the thermostat.

4. The thermostat of claim 2, wherein the controller is configured to detect the approach of the individual and wake up the thermostat when the individual is within a threshold distance from the thermostat that is 4 feet or less.

5. The thermostat of claim 1, wherein the sense die and the controller are operatively coupled to a printed circuit board disposed within the housing of the thermostat.

6. The thermostat of claim 1, wherein the lens element comprises a convex lens portion that is shifted toward one of the first or second IR detectors to preferentially direct incident IR energy toward the first IR detector.

7. The thermostat of claim 1, wherein the lens element comprises a first convex lens portion and an adjacent second convex lens portion, and the lens element is shifted toward one of the first or second IR detectors to preferentially direct incident IR energy toward the first IR detector.

8. The thermostat of claim 1, wherein the lens element comprises:
a curved surface on a first side of the lens element facing the sense die;
a substantially planar surface on a second side of the lens element adjacent the IR energy transparent element; and
a leg structure that defines a spacing between the curved surface of the lens element and the sense die.

9. The thermostat of claim 8, wherein at least part of the curved surface has a radius of curvature that ranges from about 1 millimeter to about 2 millimeters.

10. An HVAC controller, comprising:
a housing including an aperture formed within the housing;
a proximity sensor secured relative to the housing and having a field of view through the aperture that is suitable for viewing when an individual is moving towards the HVAC controller, the proximity sensor comprising:
a first IR detector secured relative to the housing;
a second IR detector secured relative to the housing, wherein the second IR detector is laterally offset in a horizontal direction from the first IR detector, and wherein a surface of the first IR detector and a surface of the second IR detector are parallel to each other;
a lens element disposed between the aperture and the proximity sensor, the lens element preferentially directing substantially all incident IR energy passing through the aperture to the first IR detector by refracting incident IR energy initially directed to the second IR detector toward the first IR detector in order to increase sensitivity of the proximity sensor; and
a controller operatively coupled to the proximity sensor and configured to wake up the HVAC controller in response to the proximity sensor sensing an individual moving towards the HVAC controller.

11. The HVAC controller of claim 10, further comprising an IR energy transparent element disposed in the aperture and/or in front of the aperture.

12. The HVAC controller of claim 10, wherein the HVAC controller further comprises a user interface and waking up the HVAC controller comprises energizing the user interface so that the approaching individual can read information displayed on the user interface and/or enter information into the user interface.

13. The HVAC controller of claim 10, wherein the controller is configured to detect the approach of the individual and wake up the HVAC controller when the individual is within a set distance from the HVAC controller, wherein the set distance is 4 feet or less.

14. The HVAC controller of claim 10, wherein the first IR detector, the second IR detector and the controller are operatively coupled to a printed circuit board disposed within the housing.

* * * * *